May 18, 1948.
J. W. JEWELL
2,441,820
METHOD AND APPARATUS FOR SUPPLYING A SLURRY
Filed April 24, 1944
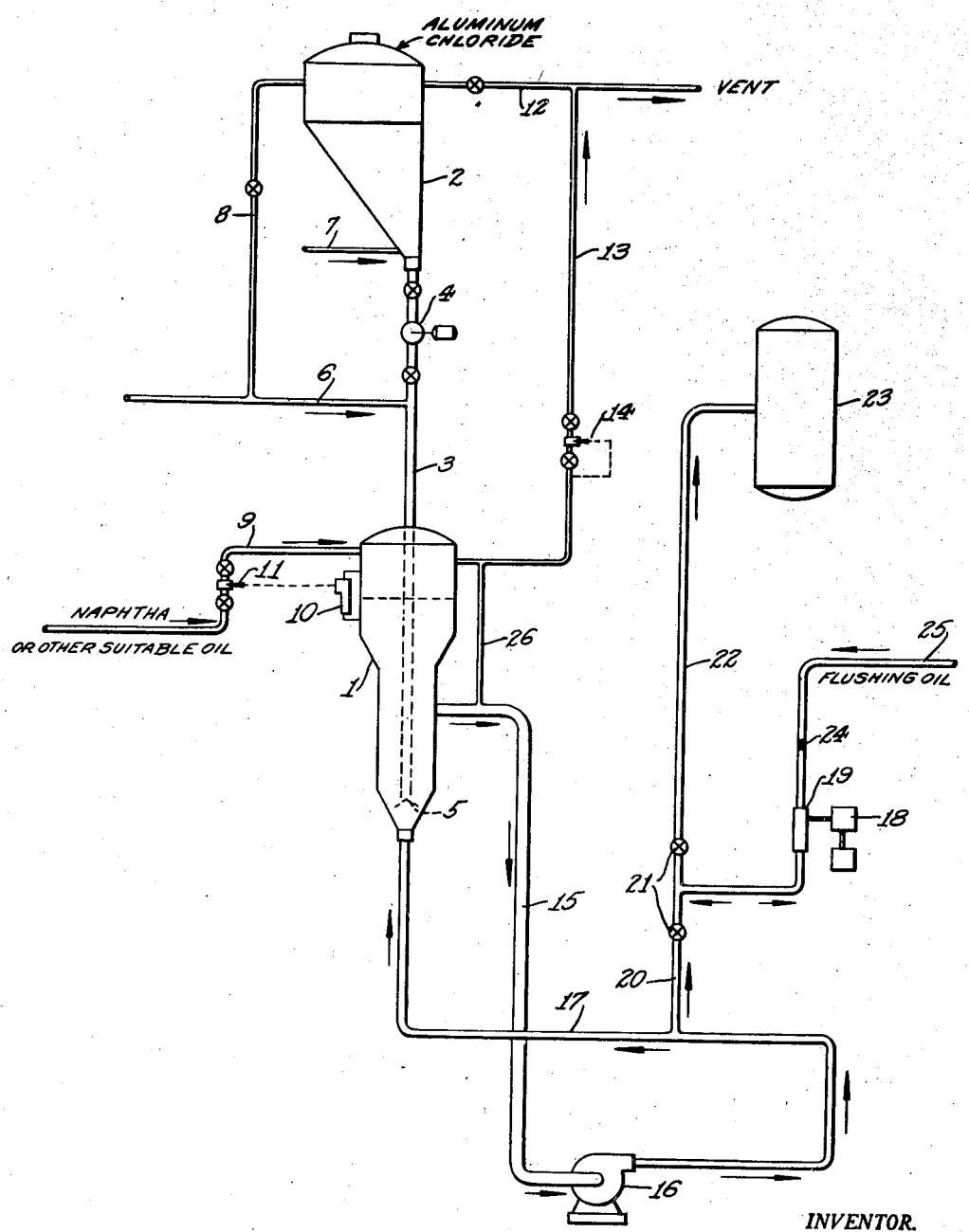
INVENTOR.
JOSEPH W. JEWELL
BY E. F. Liebrecht
G. N. Palmer
ATTORNEYS Patented May 18, 1948

2,441,820

UNITED STATES PATENT OFFICE 2,441,820

METHOD AND APPARATUS FOR SUPPLYING A SLURRY

Joseph W. Jewell, Summit, N. J., assignor to The M. W. Kellogg Company, Jersey City, N. J., a corporation of Delaware Application April 24, 1944, Serial No. 532,565

8 Claims. (Cl. 260—683.5)

This invention relates to improvements in methods and apparatus for preparing and supplying a slurry of a liquid and a finely divided solid. More particularly the invention relates to improvements in methods and apparatus for supplying a slurry of a liquid and a finely divided solid catalytic material. Still more particularly, the invention relates to improvements in methods and apparatus for supplying a catalytic mixture comprising a slurry of finely divided solid catalytic material in a hydrocarbon liquid.

It is an object of the invention to provide a method and apparatus for maintaining and supplying a slurry of a liquid and a finely divided solid of controlled concentration of the solid in the liquid. It is a further object of the invention to provide a method and apparatus for supplying continuously a small quantity of a slurry of a liquid and a finely divided solid under conditions avoiding separation of the solid and the liquid medium in the apparatus. Other objects and advantages of the improved method and apparatus will be made apparent in the following description.

The invention is useful in supplying any slurry of a liquid and finely divided solid to any operation which requires close control of the concentration of the slurry. While the invention is broadly applicable to supplying slurries of any liquids and solids it is particularly applicable to the preparation and supplying of slurries of finely divided solid catalytic material in suitable liquid vehicles. An important application of the invention is the preparation and supplying of slurries of finely divided solid catalytic material in hydrocarbon oils for use in promoting catalytic hydrocarbon reactions. A prominent example of such use of the invention is the introduction of solid catalysts, such as aluminum chloride, to catalytic hydrocarbon reaction zones. Aluminum chloride may be formed into a slurry with a hydrocarbon oil, such as a paraffinic naphtha, for introduction into a reaction zone in which the aluminum chloride functions as a catalyst for the isomerization of paraffin hydrocarbons, or for other hydrocarbon reactions.

The invention will be described in more detail with reference to the accompanying drawing which is a diagrammatic representation of apparatus suitable for the preparation and supplying of a slurry of any solid in any liquid vehicle. The invention is described, with reference to the drawing, in connection with the preparation and supply of a slurry of finely divided aluminum chloride in a paraffinic naphtha or similar hydrocarbon oil. It is to be understood, however, that this specific embodiment of the invention is intended merely as an example of an invention which includes within its scope the supplying of slurries of liquids and finely divided solids in all operations which require such a slurry in substantially constant composition.

Referring to the drawing the apparatus consists principally of a slurry mixing tank 1 and an aluminum chloride hopper 2. Hopper 2 is connected with mixing tank 1 by a pipe 3 which extends downwardly in tank 1 to a point adjacent the bottom thereof. A rotary feeder 4 is provided in pipe 3 to effect transfer of the aluminum chloride or other finely divided solid from hopper 2 into tank 1. Feeder 4 is provided with suitable speed control to vary, if desired, the quantity of solid thus transferred.

Mixing tank 1 is kept filled with the liquid vehicle for the slurry, such as naphtha, to a point adjacent the upper end thereof. The finely divided solids introduced into tank 1 through line 3 are mixed with the naphtha to form the desired slurry. A baffle 5 provided with perforations, not shown, is located just below the end of pipe 3 to assist in the mixing. To prevent flow of liquid up into pipe 3 an inert gas, such as hydrogen, nitrogen, or methane, is introduced into line 3, from an external source, at 6. Aside from excluding liquid from pipe 3 the inert gas assists mixing of the solids and liquid and provides an easy method for controlling pressure.

The mass of finely divided solids in hopper 2 is maintained in an aerated condition by a similar inert gas from an external source 7. Line 6 may be connected with the top of hopper 2 by line 8, as shown, to equalize the pressure above and below hopper 2. The valve in line 8 is normally open to permit such equalization of pressure but is closed during the time when hopper 2 is being filled. A vent line 12, connecting with the upper portion of hopper 2, is provided for releasing the gas from the hopper during such charging periods. The valve in line 12 is thus normally closed. Excess gas from tank 1 is withdrawn through line 13 which is provided with a pressure control valve 14 and connects with vent line 12.

The naphtha or other liquid is supplied to the upper part of tank 1 through line 9. A liquid level controller 10, which controls the operation of valve 11 in line 9, regulates the supply of liquid to tank 1 to maintain the liquid level at the desired point. The upper portion of tank 1 is enlarged to provide a relatively quiescent zone to avoid the circulation of fine particles of solid in the upper part of the body of liquid. The enlarged portion of tank 1 is sufficiently high to provide a holding time of the liquid which prevents any interference by finely divided solid materials with the operation of liquid level controller 10.

The slurry formed in tank 1 is withdrawn from a point near the top of the constricted section thereof through line 15 which connects with the suction side of pump 16. Line 26 is provided to permit entrained gas to escape to vent line 12. The exit of pump 16 is connected in turn by line 17 with the bottom of tank 1. Tank 1, line 15, pump 16 and line 17 thus provide a closed circuit for the circulation of slurry. Lines 15 and 17 are sufficiently large that the quantity of slurry thus circulated is relatively large in relation to the quantity of slurry which is to be supplied to the point at which it is to be used. The slurry is circulated through lines 15 and 17 at a rate effective to prevent settling. The lower, or restricted, portion of tank 1 is of a diameter such that the upward velocity of the circulating liquid introduced through line 17 is sufficient to carry all the solid material in tank 1 upwardly at an operable equilibrium concentration.

In accordance with the preferred modification of this invention the circuit comprising lines 15 and 17 extends from the mixing equipment comprising tank 1 and hopper 2 to a point horizontally adjacent the point at which the slurry is to be used, whereby the slurry can be diverted from line 17 to the point of use through substantially vertical lines. This arrangement thus provides for transferring slurry from mixing tank 1 over any horizontal distance between the latter and the point of use through the circuit comprising lines 15 and 17, through which the slurry travels at high velocity and in great volume.

To effect the diversion of slurry from line 17 to the point of use a reciprocating pump 18, with a surge chamber 19, is utilized to withdraw slurry from line 17 through line 20 and pumps through check valves 21 to line 22 which connects with the point of use of the slurry, indicated at 23. Check valves 21 are so associated with the reciprocating action of pump 18 that on the intake stroke of the pump piston slurry is drawn through the lower valve 21, positioned in line 20, and part way up line 25 towards surge chamber 19. During this period the upper check valve 21, positioned in line 22, automatically actuates itself to prevent slurry from being drawn into line 25 from line 22. On the reverse stroke of pump 18 the slurry thus drawn through the lower check valve 21 is forced through upper check valve 21 into line 22. During this period the mechanism of lower check valve 21 automatically is actuated to prevent return of slurry from line 25 into line 20. The automatic checking function of valves 21 thus cooperate with the reciprocating action of pump 18 to withdraw slurry from line 17 and transfer it through lines 20 and 22 to the indicated point of use at 23. Lines 20 and 22 are arranged as nearly vertical as possible to minimize the effect of any change in concentration of slurry in the lines.

To exclude solid materials from pump 18 flushing oil, which is similar in composition to the oil introduced into tank 1 through line 9, flows through orifice 24 in line 25 to the top of surge chamber 19. This provides a small excess of clean oil to keep any solid from reaching the pump.

The size of pipe lines 20 and 22 naturally is that required to effect the supplying of slurry to 23 at the required rate. Line 17 is sufficiently larger than line 20 that the quantity of slurry flowing through line 17 is not substantially reduced by the amount withdrawn through line 20. The fixed rate of flow of the slurry through line 17 is independent of the feed rate through line 20 and is regulated merely to permit the flow of the slurry through a circuit which includes horizontal portions at a rate which prevents settling and accumulation in the line of solids which might cause stoppage. This system is particularly advantageous in handling small quantities of feed in situations in which the flow rate necessary to avoid stoppages in horizontal sections of the supply lines would require the use of very small pipes. The use of very small pipes is disadvantageous because of the danger of stoppage and also because such small pipes are quite fragile and are subject to breakage from external blows. The latter possibility is an important factor in handling a liquid vehicle which is inflammable or corrosive. Furthermore in very small pipe lines a small change in actual flow rate makes a considerable change in velocity and control is difficult. On the other hand the velocity in larger upflow lines such as line 20 may vary over a wide range without trouble as changes in velocity result merely in a change in concentration in the line without changing the feed rate.

For a specific example of the operation of the system illustrated by the drawing reference may be had to a commercial operation for supplying 360 barrels per day of a slurry of a light naphtha containing 7,000 pounds of finely divided aluminum chloride. In this operation the slurry is circulated through the circuit comprising line 15, pump 16 and line 17 at the rate of 10,800 barrels per day. In this circuit line 15 has an inside diameter of 6 inches while line 17 has an inside diameter of 4 inches. The slurry is withdrawn continuously through line 20 at the rate of 360 barrels per day and equivalent quantities of naphtha and aluminum chloride are introduced into vessel 1 through lines 9 and 3, respectively.

This example involves a commercial operation for the isomerization of paraffin hydrocarbons in a reactor represented diagrammatically at 23. It will be understood, however, that the processes of the invention are applicable to forming and supplying any slurry for any use under the conditions described above.

I claim:

1. A method for supplying a slurry of a liquid and a finely divided solid to a point of use which comprises circulating the slurry, in a quantity substantially greater than that required to be supplied to the point of use, in a circuit including a vertically extending turbulent zone of relatively great cross-sectional area having superimposed thereover and in direct liquid to liquid contact therewith a relatively quiescent zone of substantially greater cross-sectional area wherein circulation of the finely divided particles is substantially avoided in the upper part thereof, and a turbulent section of restricted cross-sectional area extending, at least partly horizontally, between the turbulent zone of first mention and a point horizontally adjacent the point of use, continuously diverting a small proportion of the circulating slurry at a point horizontally adjacent the point of use, transferring the diverted slurry in a substantially vertical path of flow to the point of use, continuously adding liquid to said quiescent zone to maintain a constant liquid level thereby, and continuously adding to said circulating body of slurry from said quiescent zone at the point of direct liquid to liquid contact a quantity of liquid equivalent to the quantity of liquid in the slurry thus diverted.

2. A method for supplying a slurry of a liquid and a finely divided solid to a point of use which comprises circulating the slurry, in a quantity substantially greater than that required to be supplied to the point of use and at a rate effective to prevent settling of the finely divided solid, in a circuit extending, at least partly horizontally, between a vertically extending enlarged turbulent zone in said circuit having superimposed thereover and in direct liquid to liquid contact therewith a quiescent zone in the upper part of which circulation of fine solid particles is avoided and a point of minimum horizontal displacement from the point of use, continuously diverting vertically upward a relatively small proportion of the circulating slurry at a point of minimum horizontal displacement from the point of use, transferring the diverted slurry in a substantially vertical path of flow to the point of use, continuously adding liquid to said quiescent zone to maintain a constant liquid level thereby continuously adding a liquid to said turbulent zone from the quiescent zone at the point of direct liquid to liquid contact, and continuously adding a mixture of finely divided solid and inert gas to said circulating slurry in the bottom of said enlarged turbulent zone thereby continuously and simultaneously adding to said circulating slurry in said enlarged turbulent zone quantities of liquid and solid equivalent to the quantity of slurry diverted from the circuit.

3. A method for supplying continuously a small quantity of a slurry of a liqiud vehicle and finely divided solid catalyst of closely controlled catalyst concentration for a hydrocarbon reaction to a reaction zone which comprises circulating a slurry of said finely divided solid catalyst in a hydrocarbon oil vehicle, in a quantity substantially greater than that required to be supplied to the reaction zone and at a rate effective to prevent settling of the catalyst, in a circuit including a vertically extending turbulent zone of relatively great cross-sectional area and a turbulent zone of restricted cross-sectional area extending, at least partly horizontally, between the turbulent zone of first mention and a point of minimum horizontal displacement from the reaction zone, continuously adding make-up finely divided solid catalyst aerated with an inert gas to said turbulent zone of first mention equivalent to the quantity thereof in the slurry subsequently diverted from the circuit, continuously removing said inert gas from said turbulent zone of first mention, continuously diverting vertically upward a small proportion of the circulating slurry at a point of minimum horizontal displacement from the reaction zone, and transferring the diverted slurry in a substantially vertical path of flow to said reaction zone.

4. A method for supplying continuously a small quantity of finely divided aluminum chloride to a hydrocarbon isomerization reaction zone which comprises circulating a slurry of finely divided aluminum chloride in a paraffinic hydrocarbon oil vehicle, in a quantity substantially greater than that required to be supplied to the reaction zone and at a rate effective to prevent settling of the finely divided aluminum chloride, in a circuit extending at least partly horizontally between a vertically extending enlarged turbulent zone in said circuit having superimposed thereover and in direct liquid to liquid contact therewith a quiescent zone in the upper part of which circulation of fine particles of aluminum chloride is substantially avoided and a point of minimum horizontal displacement from the reaction zone, continuously diverting vertically upward a small proportion of the circulating slurry at a point of minimum horizontal displacement from said reaction zone, transferring the diverted slurry in a substantially vertical path of flow to said reaction zone and at a rate effective to prevent substantial settling of the finely divided aluminum chloride, continuously adding paraffinic hydrocarbon oil to said quiescent zone to maintain a constant liquid level therein whereby paraffinic hydrocarbon oil is added continuously to said turbulent zone from the quiescent zone at the point of liquid to liquid contact, continuously adding a mixture of finely divided aluminum chloride and inert gas to said circulating slurry at the bottom of said enlarged turbulent zone thereby continuously and simultaneously adding to said circulating slurry quantities of paraffinic oil and finely divided aluminum chloride equivalent to the quantities thereof in the slurry diverted from the circuit to said reaction zone.

5. A method of continuously supplying a slurry of finely divided solid catalyst in hydrocarbon oil to a hydrocarbon reaction zone in relatively small quantities of closely controlled catalyst concentration which comprises circulating the slurry, in a quantity substantially greater than that required to be supplied to the reaction zone, through a closed circuit including a vertically extending turbulent zone of relatively great cross-sectional area having superimposed thereover and in direct liquid to liquid contact therewith a quiescent zone of greater cross-sectional area, and a turbulent zone of restricted cross-sectional area originating at an intermediate point and terminating at the bottom of said turbulent zone of first mention and extending, at least partly horizontally, to a point horizontally adjacent said reaction zone, continuously diverting a small proportion of the circulating slurry at a point horizontally adjacent said reaction zone, transferring the diverted slurry in a substantially vertical path of flow to said reaction zone, continuously adding make-up hydrocarbon oil to said slurry circuit from said quiescent zone by maintaining a constant liquid level of hydrocarbon oil therein, continuously adding make-up finely divided solid catalyst by adding a mixture of said catalyst and inert gas into the bottom of said vertically extending turbulent zone of first mention whereby finely divided solid catalyst particles and hydrocarbon oil are uniformly incorporated into said circulating slurry in quantities equivalent to the quantity of slurry diverted from the circuit.

6. A method for supplying a slurry of a liquid and a finely divided solid of closely controlled concentration to a zone of use, which comprises circulating the slurry, in a quantity substantially greater than that required to be supplied to the zone of use and at a rate effective to prevent settling, in a circuit extending, at least partly horizontally, between the zone of formation of the slurry and a point of minimum horizontal displacement from the zone of use, said circuit initiating from an intermediate point in the zone of formation of the slurry and terminating at a lower point in said zone, continuously diverting vertically upward a small proportion of the circulating slurry at a point of minimum horizontal displacement from the zone of use whereby the diverted slurry may be transferred in a substantially vertical path of flow to the zone of use, and transferring the diverted slurry upwardly in a substantially vertical path of flow to the zone of use.

7. A method for supplying a slurry of a liquid and a finely divided solid of closely controlled concentration to a zone of use, which comprises circulating the slurry, in a quantity substantially greater than that required to be supplied to the zone of use and at a rate effective to prevent settling, in a circuit extending, at least partly horizontally, between the zone of formation of the slurry and a point of minimum horizontal displacement from the zone of use, said circuit initiating from an intermediate point in the zone of formation of the slurry and terminating at a lower point in said zone, continuously diverting vertically upward a small proportion of the circulating slurry at a point of minimum horizontal displacement from the zone of use whereby the diverted slurry may be transferred in a substantially vertical path of flow to the zone of use, transferring the diverted slurry upwardly in a substantially vertical path of flow to the zone of use, and continuously adding to the body of said circulating slurry at the zone of formation quantities of liquid and solid equivalent to the slurry thus diverted.

8. Apparatus for supplying continuously a small quantity of a slurry of a liquid and a finely divided solid of closely controlled concentration to a point of use, which comprises a mixing vessel for mixing the liquid and solid to form the slurry, a conduit external of said vessel connected at each end to the vessel and extending from said vessel, at least partly horizontally, to a point of minimum horizontal displacement from the point of use of the slurry, said conduit initiating from a slurry intake opening at an intermediate point and terminating with a slurry discharge opening at a lower point in said vessel and being sufficiently large and connected to said mixing vessel to permit circulation of slurry through said conduit in a quantity substantially greater than that required to be supplied to the point of use and at a rate effective to prevent settling, pumping means associated with said conduit to effect circulation of said slurry from said intake opening through said conduit to said discharge opening at a velocity sufficiently high to prevent substantial separation of the components of the slurry in said conduit, means connected with said conduit at a point of minimum horizontal displacement from the point of use for diverting vertically upward from said conduit a relatively small proportion of the circulating slurry, and vertical conduit means for transferring the diverted slurry upwardly to the point of use.

JOSEPH W. JEWELL.

REFERENCES CITED

The following references are of record in the file of this patent:

UNITED STATES PATENTS

| Number | Name | Date |
|---|---|---|
| 2,041,858 | Pfirrmann | May 26, 1936 |
| 2,088,214 | Pfirrmann | July 27, 1937 |
| 2,192,094 | Moore | Feb. 27, 1940 |
| 2,220,092 | Evering et al. | Nov. 5, 1940 |
| 2,334,553 | Harding | Nov. 16, 1943 |

FOREIGN PATENTS

| Number | Country | Date |
|---|---|---|
| 329,044 | Great Britain | May 15, 1930 |
| 435,457 | Great Britain | Sept. 20, 1935 |